United States Patent
Ying

(10) Patent No.: US 10,515,610 B2
(45) Date of Patent: Dec. 24, 2019

(54) FLOATING WINDOW PROCESSING METHOD AND APPARATUS

(71) Applicant: Tencent Technology (Shenzhen) Company Limited, Shenzhen, Guangdong (CN)

(72) Inventor: Yulong Ying, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 48 days.

(21) Appl. No.: 15/699,318

(22) Filed: Sep. 8, 2017

(65) Prior Publication Data

US 2017/0372678 A1    Dec. 28, 2017

Related U.S. Application Data

(63) Continuation of application No. PCT/CN2016/109924, filed on Dec. 14, 2016.

(30) Foreign Application Priority Data

Dec. 15, 2015 (CN) .......................... 2015 1 0933683

(51) Int. Cl.
  *G06F 3/0484* (2013.01)
  *G09G 5/14* (2006.01)

(52) U.S. Cl.
  CPC ........... *G09G 5/14* (2013.01); *G06F 3/04845* (2013.01); *G09G 2340/045* (2013.01); *G09G 2340/0464* (2013.01); *G09G 2354/00* (2013.01)

(58) Field of Classification Search
  None
  See application file for complete search history.

(56) References Cited

U.S. PATENT DOCUMENTS

| | | | | |
|---|---|---|---|---|
| 6,166,736 A | * | 12/2000 | Hugh | G06F 3/0481 715/777 |
| 9,448,633 B2 | * | 9/2016 | Rodgers | G06T 13/80 |

(Continued)

FOREIGN PATENT DOCUMENTS

| | | |
|---|---|---|
| CN | 102045269 A | 5/2011 |
| CN | 103729107 A | 4/2014 |

(Continued)

OTHER PUBLICATIONS

ISR and Written Opinion corresponding to PCT Application No. PCT/CN2016/109924, dated Feb. 23, 2017, (11p).

*Primary Examiner* — Beau D Spratt
(74) *Attorney, Agent, or Firm* — Brinks Gilson & Lione

(57) ABSTRACT

A floating window processing method and apparatus is disclosed. The method includes: displaying a floating window in a target display area of a display screen; obtaining an operation signal that works on the floating window; determining a form variation parameter of the floating window according to the operation signal; and dynamically regulating a display form of the floating window, the display form including a display location and/or size. With this disclosure, a problem that a floating window is displayed in a fixed location on a screen, causing great inconvenience for watching other content that is displayed out of the floating window is resolved, a moving function and a zoom function of the floating window are extended. Therefore, it is convenient for the user to watch the other content that is displayed out of the floating window.

14 Claims, 12 Drawing Sheets

(56) References Cited

U.S. PATENT DOCUMENTS

| | | | | |
|---|---|---|---|---|
| 10,254,942 B2* | 4/2019 | Vranjes | ............... | G06F 3/04847 |
| 2010/0079405 A1* | 4/2010 | Bernstein | ............ | G06F 3/04883 |
| | | | | 345/174 |
| 2010/0088634 A1* | 4/2010 | Tsuruta | ................ | G06F 3/0481 |
| | | | | 715/800 |
| 2011/0163944 A1* | 7/2011 | Bilbrey | ................. | G01D 21/02 |
| | | | | 345/156 |
| 2011/0249073 A1* | 10/2011 | Cranfill | ................. | H04N 7/147 |
| | | | | 348/14.02 |
| 2012/0306891 A1* | 12/2012 | Shaffer | ................... | G06T 13/00 |
| | | | | 345/473 |
| 2014/0237420 A1* | 8/2014 | Song | .................. | G06F 3/04845 |
| | | | | 715/790 |
| 2015/0268724 A1* | 9/2015 | Levesque | ............... | G06F 3/016 |
| | | | | 345/156 |
| 2017/0168651 A1* | 6/2017 | Ikeda | ..................... | G06F 3/011 |

FOREIGN PATENT DOCUMENTS

| | | |
|---|---|---|
| CN | 103986962 A | 8/2014 |
| CN | 105554553 A | 5/2016 |

\* cited by examiner

FLOATING WINDOW PROCESSING METHOD AND APPARATUS

RELATED APPLICATION

This application is a continuation application of PCT Patent Application No. PCT/CN2016/109924, filed on Dec. 14, 2016, which claims priority to Chinese Patent Application No. 201510933683.0 filed with the Chinese Patent Office on Dec. 15, 2015, both of which are incorporated herein by reference in their entireties.

FIELD OF THE TECHNOLOGY

This disclosure relates to the field of image display technologies, and in particular, to a floating window processing method and apparatus.

BACKGROUND OF THE DISCLOSURE

A terminal device such as a mobile phone usually has a function to play a video, so that a user can play a video by using a video player installed in the terminal device.

A browser is used as an example. To meet a requirement for a user to watch a video and browse content on a web page at a same time, the browser is provided with a function of playing a video by using a floating window. The floating window that is used for playing a video is superposed on a top layer of a web page that is displayed in the browser. A display size of the floating window is less than a size of a screen, to ensure that a part of content in the web page on a lower layer of the floating window is not blocked by the floating window, so that while watching a video displayed in the floating window, the user can browse the web page at the same time. For example, by using the foregoing functions, the user can browse and select a to-be-played video in the web page while watching a video.

However, the foregoing floating window is usually displayed in a fixed location on the screen, causing great inconvenience to the user for watching other content that is displayed out of the floating window.

SUMMARY

To resolve the foregoing problem that a floating window is displayed in a fixed location on a screen, causing great inconvenience to a user for watching other content that is displayed out of the floating window, this disclosure provides a floating window processing method and apparatus. The technical solutions are as follows:

According to one aspect, a floating window processing method is provided, the method including:

displaying, by a terminal device comprising a memory, a display screen, and a processor in communication with the memory and the display screen, a floating window in a target display area of a the display screen;

obtaining, by the terminal device, an operation signal that operates that works on the floating window;

determining, by the terminal device, a form variation parameter of the floating window according to the operation signal; and dynamically regulating, by the terminal device, a display form of the floating window according to the form variation parameter, the display form comprising a display location or a display size.

According to another aspect, a floating window processing apparatus is provided, the apparatus including:

a memory storing instructions;

a display screen; and a processor in communication with the memory and the display screen, wherein, when the processor executes the instructions, the processor is configured to cause the apparatus to:

display a floating window in a target display area of the display screen;

obtain an operation signal that operates on the floating window;

determine a form variation parameter of the floating window according to the operation signal; and dynamically regulate a display form of the floating window according to the form variation parameter, the display form comprising a display location or a display size.

This disclosure further provides a floating window processing apparatus, the apparatus including:

at least one processor; and a memory, the memory storing a program instruction, and the instruction, when executed by the at least one processor, causing the apparatus to perform the foregoing floating window processing method.

This disclosure further provides a non-transitory computer readable storage medium storing an instruction, and the instruction, when executed by a processor of an apparatus, causing the apparatus to perform:

displaying a floating window in a target display area of a display screen;

obtaining an operation signal that operates on the floating window;

determining a form variation parameter of the floating window according to the operation signal; and dynamically regulating a display form of the floating window according to the form variation parameter, the display form comprising a display location or a display size.

Beneficial effects of the technical solutions that are provided in this disclosure are as follows:

After an operation signal that works on a floating window is obtained, a display form of the floating window is regulated according to the operation signal, so that a problem in the existing technology is resolved that a floating window is displayed in a fixed location on a screen, causing great inconvenience to a user for watching other content that is displayed out of the floating window, a moving function and a zoom function of the floating window are extended, and a requirement that a user regulates and controls the floating window in a self-defined manner is met. Therefore, it is convenient for the user to watch the other content that is displayed out of the floating window.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may derive other drawings from these accompanying drawings.

DESCRIPTION OF EMBODIMENTS

To make the objectives, technical solutions, and advantages of this disclosure clearer, the following further describes the embodiments of the present disclosure in detail with reference to the accompanying drawings.

A method provided in the embodiments of the present disclosure may be applied to a terminal device such as a mobile phone, a tablet computer, a personal computer (PC), a smart TV, or the like.

Optionally, the method provided in the embodiments of the present disclosure may be applied to an application (such as a browser or a video player application) that is installed and runs in the foregoing terminal device. When a floating window is used for playing a video, a floating window processing method in the embodiments of the present disclosure is used for implementing a video play function. For ease of description, in the following method embodiments, only that an execution body is a terminal device is used as an example for description, but the execution body of each step is not limited thereto.

Interfaces (or windows) of multiple applications or multiple interfaces (or windows) of a same application may be displayed at a same time in a display screen of a terminal device. One of the interfaces is an active interface. The active interface usually blocks another interface while being used. A floating window is an exception since the floating window is not blocked by the active interface. That is, when a user operates or uses an active interface, the user can view content displayed in a floating window without performing operation on the floating window.

Figure 1:
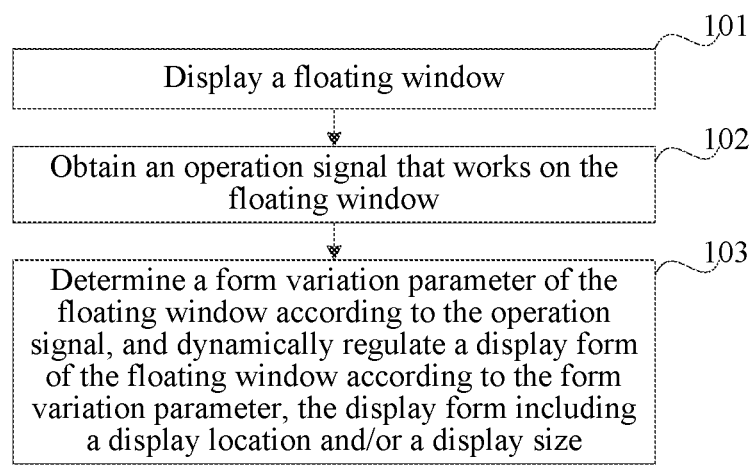
FIG. 1 is a flowchart of a floating window processing method according to an embodiment of the present disclosure.

Referring to FIG. 1, FIG. 1 is a flowchart of a floating window processing method according to an embodiment of the present disclosure. The method may include the following several steps:

Step 101: Display a floating window.

The floating window may be used for playing a video, displaying an image or a text, or the like, and may be displayed in a target display area of a display screen.

Step 102: Obtain an operation signal that works on the floating window.

Step 103: Determine a form variation parameter of the floating window according to the operation signal, and dynamically regulate a display form of the floating window according to the form variation parameter, the display form including a display location and/or a display size. The display size of the display window includes a length and a width of the display window.

Based on the above, in the method provided in this embodiment, after an operation signal that works on a floating window is obtained, a display form of the floating window is regulated according to the operation signal, so that a problem in the existing technology that a floating window is displayed in a fixed location on a screen, causing great inconvenience to a user for watching other content that is displayed out of the floating window is resolved. A moving function and a zoom function of the floating window are extended, and a requirement that a user regulates and controls the floating window in a self-defined manner is met. Therefore, it is convenient for the user to watch the other content that is displayed out of the floating window.

Figure 2A:
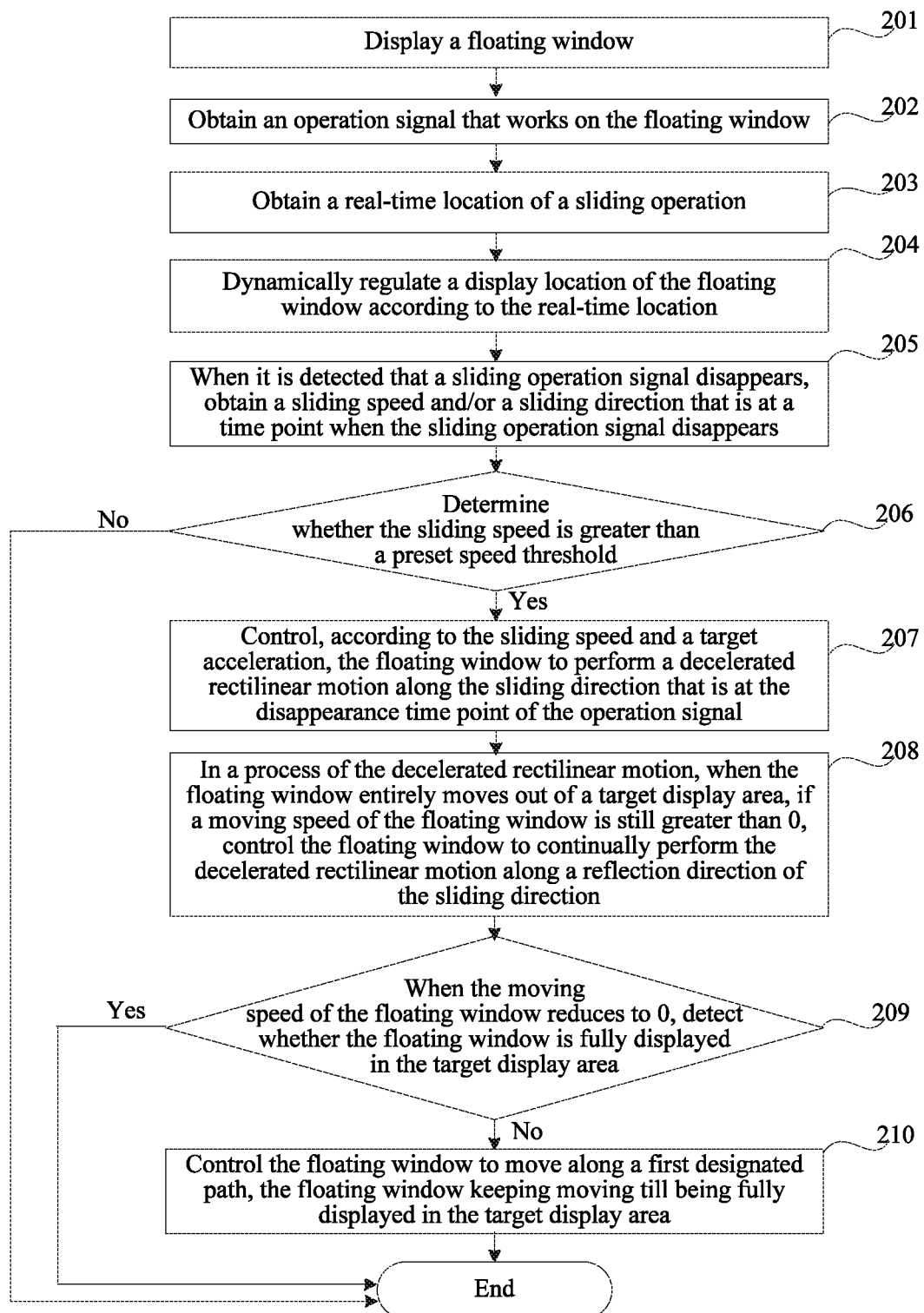
FIG. 2A is a flowchart of a floating window processing method according to another embodiment of the present disclosure.

Referring to FIG. 2A, FIG. 2A is a flowchart of a floating window processing method according to another embodiment of the present disclosure. The floating window may be used for playing a video, displaying an image or a text, or the like.

This embodiment is described below by using a floating window that is used for playing a video as an example. A person skilled in the art may understand that the following descriptions may also be applied to another type of floating window. The method may include the following several steps:

Step 201: Display a floating window.

The floating window is displayed in a target display area of a display screen of a terminal device.

A target display area refers to an area that is on a screen of a display and that is used for displaying a floating window. The floating window can only be displayed in the area, but cannot be displayed out of the area. For example, the target display area may be an entire screen area, or may be a part of the screen area. For ease of description, the target display area being the entire screen area is described below.

The terminal device enables a video player, creates a floating window that is used for playing a video, sets an attribute of the floating window, and then displays the floating window on the screen. A video player refers to software that can play a video that is stored in a form of a digital signal. In this embodiment of the present disclosure, the video player is used for loading a video image to the floating window for displaying the video image in the floating window. The attribute of the floating window includes but is not limited to: a size, a color, transparency, mobility, size adjustment, and top-screen display of the floating window.

An Android system is used as an example. A surfaceView that is used for displaying a video image is created, an attribute such as a size, a color, transparency, mobility, size adjustment, or top-screen display of the surfaceView is set, and the surfaceView is added to a screen by using a WindowManager interface. Because the attribute of the surfaceView is set to be top-screen display, the surfaceView is directly displayed in a floating state after being added to the screen. A View is a base class of the Android system that represents a rectangular area on the screen, and is responsible for drawing the area and processing a corresponding event. A surface is a logical entity that is in the Android system and that is used for managing data of displayed content, and includes storage and exchange of the data. The surfaceView is a sub-class of the View, and is used for displaying the content that is displayed in the Surface on the screen. In a video player, the surfaceView is a video play interface that is visible to a user. A WindowManager interface is a service interface of the Android system, and is used for adding the View to the screen or removing the View from the screen. One end of objects that face the WindowManager interface is the screen, and the other end is the View. The View may be added to and displayed on the screen by using the addView method of the WindowManager interface. Display effects are different due to different attributes of the View.

In this embodiment, that the floating window is a movable window is used as an example, that is, the attribute of the floating window is set to be movable, so that a display position of the floating window is movable.

Step 202: Obtain an operation signal that works on the floating window.

The terminal device obtains the operation signal that works on the floating window.

This embodiment is described below by using the operation signal being a sliding operation signal that is along a target direction as an example. The terminal device may include a touch-sensitive display screen. The user may touch the display screen of the terminal device by using a finger, moves the finger to perform a sliding operation, triggers a sliding operation signal that works on the floating window, and triggers the floating window to move along a direction of the sliding operation. In addition to the finger, the user may further perform the sliding operation by using a stylus pen, or the like. The user may use more than one finger to touch the display screen.

Step 203: Obtain a real-time location of a sliding operation.

In a sliding operation process, the terminal device obtains a real-time location of the sliding operation. The real-time location of the sliding operation usually refers to a real-time touch location that is of the finger of the user or another object (such as a stylus pen) and that is in the display screen of the terminal device.

Step 204: Dynamically regulate a display location of the floating window according to the real-time location of the sliding operation.

The terminal device dynamically regulates the display location of the floating window according to the real-time location of the sliding operation. In the sliding operation process, the terminal device displays in real time the floating window in the real-time location of the sliding operation, to implement a dragging function that the floating window moves on the screen with the finger of the user.

Figure 2B:
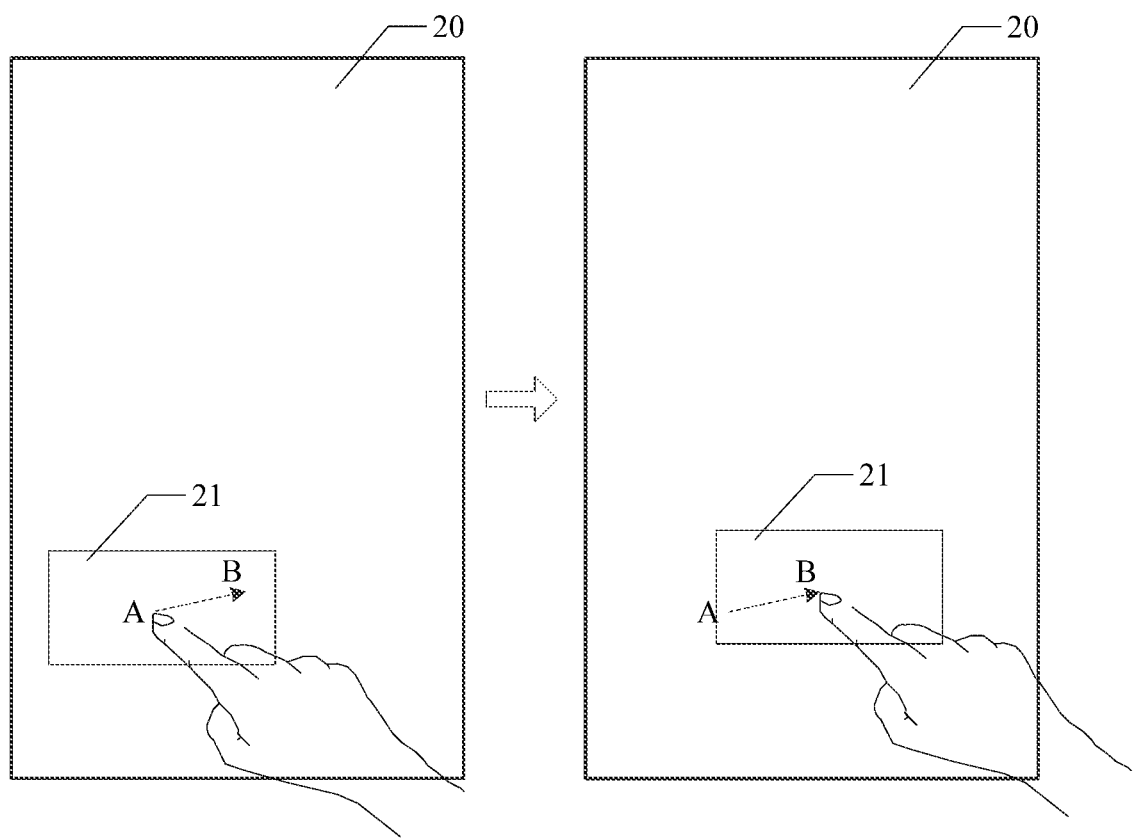
FIG. 2B to FIG. 2E are schematic diagrams of an interface that is related to the embodiment shown in FIG. 2A.

Referring to FIG. 2B, FIG. 2B is a schematic diagram of dragging a floating window. A floating window 21 is displayed on a screen 20 of a terminal device. A finger of a user selects the floating window 21, and triggers a sliding operation signal that is along a target direction. The finger of the user moves from a location A to a location B. Correspondingly, the terminal device controls the floating window 21 to move in real time with the finger of the user when the finger of the user slides.

Step 205: When it is detected that a sliding operation signal disappears, obtain a sliding speed and/or a sliding direction of the sliding operation at a time point when the sliding operation signal disappears.

When it is detected that the sliding operation signal disappears, the terminal device obtains the sliding speed that is at the time point when the sliding operation signal disappears. That is, the terminal device obtains a moving speed of the finger (or the stylus pen) when the finger of the user leaves the screen. The speed may be equal to or substantially the same as a moving speed of the floating window.

Step 206: Determine whether the sliding speed is greater than a preset speed threshold. If the sliding speed is greater than the preset speed threshold, step 207 is performed. If the sliding speed is not greater than the preset speed threshold, the procedure ends.

The terminal device detects whether the sliding speed at the time point when the sliding operation signal disappears is greater than the preset speed threshold. By comparing the sliding speed that is at the time point when the sliding operation signal disappears, the terminal device determines a moving status of the floating window after the sliding operation signal disappears. The preset speed threshold may be set by a system by default, or may be defined by the user.

When the foregoing sliding speed is greater than the preset speed threshold, is it considered that the foregoing sliding operation that is triggered by the user is a whipping operation. The foregoing sliding speed may be the sliding speed at the time point when the sliding operation signal disappears. The terminal device performs step 207, and controls the floating window to continually move, to implement a whipping function of the floating window.

When the foregoing sliding speed is less than or equal to the preset speed threshold, it is considered that the foregoing sliding operation triggered by the user is a dragging operation. The floating window stops moving right after the sliding operation signal disappears.

Step 207: Control, according to the sliding speed and a target acceleration at the time point when the operation signal disappears, the floating window to perform a decelerated rectilinear motion along the sliding direction that is at the time point when the operation signal disappears.

The terminal device controls, according to the sliding speed and the target acceleration that are at the disappearance time point of the operation signal, the floating window to perform the decelerated rectilinear motion along the sliding direction that is at the disappearance time point of the operation signal. In a possible implementation, the terminal device uses the sliding speed that is at the disappearance time point of the sliding operation signal as an initial speed, uses the sliding direction that is at the disappearance time point of the sliding operation signal as a motion direction, and controls, according to the target acceleration, the floating window to perform the decelerated rectilinear motion, the floating window keeping moving till the moving speed drops to 0. The target acceleration may be a preset value, or may be a value that is determined in real time according to the sliding operation signal, for example, a value that is determined according to the sliding speed that is at the disappearance time point of the sliding operation signal. In addition, the target acceleration may be a fixed value, and the floating window correspondingly performs a linear motion with constant deceleration. Alternatively, the target acceleration may be a variable, and the floating window correspondingly performs a linear motion with varying deceleration.

Figure 2C:
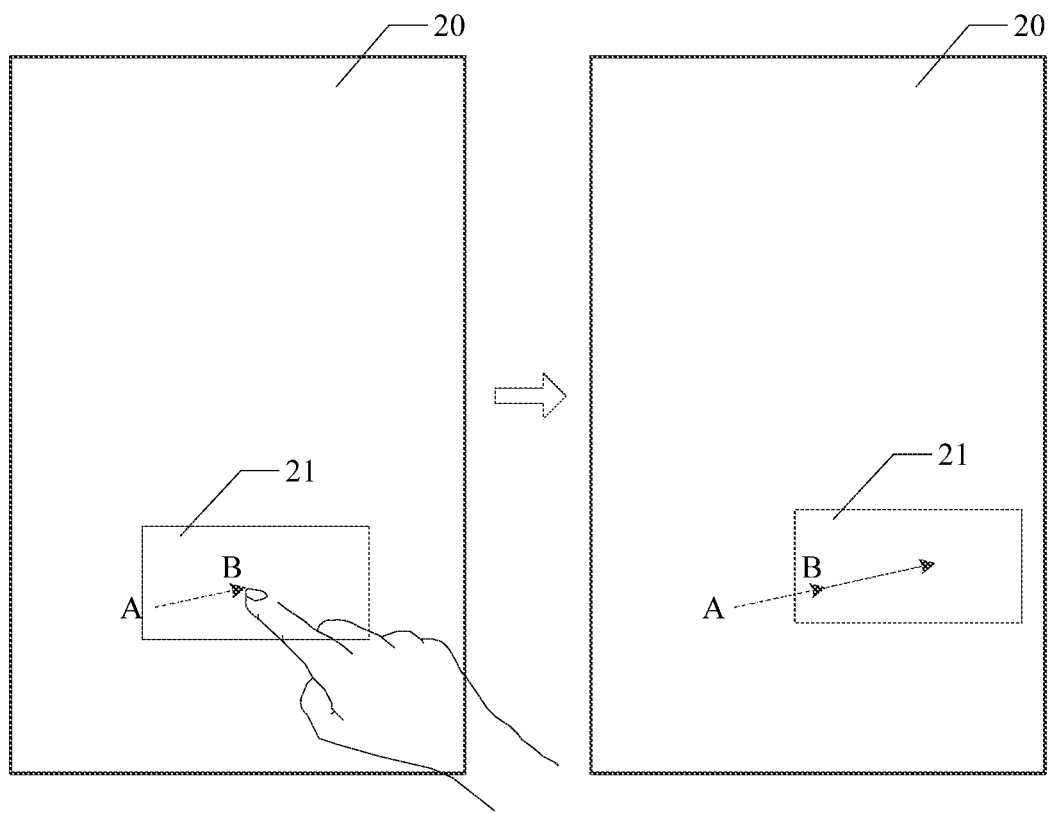

Referring to FIG. 2C, FIG. 2C is a schematic diagram of whipping a floating window. When a finger of a user leaves from a location B, assuming that in this case, a moving speed of a floating window 21 is greater than a preset speed threshold, a terminal device controls the floating window 21 to continually perform a decelerated rectilinear motion, the floating window 21 keeping moving till the moving speed changes to 0.

Certainly, in another possible implementation, the terminal device may control, according to a sliding speed and a target acceleration, the floating window to perform the decelerated rectilinear motion or a deceleration curve motion along a preset direction. The determination of either a linear or curve motion may depend on the sliding operation signal. This is not limited in this embodiment.

Step 208: In a process of the decelerated rectilinear motion, when the floating window entirely moves out of a target display area, if a moving speed of the floating window is still greater than 0, control the floating window to continually perform the decelerated rectilinear motion along a reflection direction of the sliding direction.

In a process of the decelerated rectilinear motion, when the floating window entirely moves out of the target display area, if a moving speed of the floating window is still greater than 0, the terminal device controls the floating window to continually perform the decelerated rectilinear motion along a reflection direction of the sliding direction. In the foregoing manner, when the floating window entirely moves out of a border of the target display area, the floating window is controlled to rebound and move back into the target display area, an animation effect of a rebound obtained by colliding the border of the target display area is simulated, to implement a collision and rebound function of the floating window.

Figure 2D:
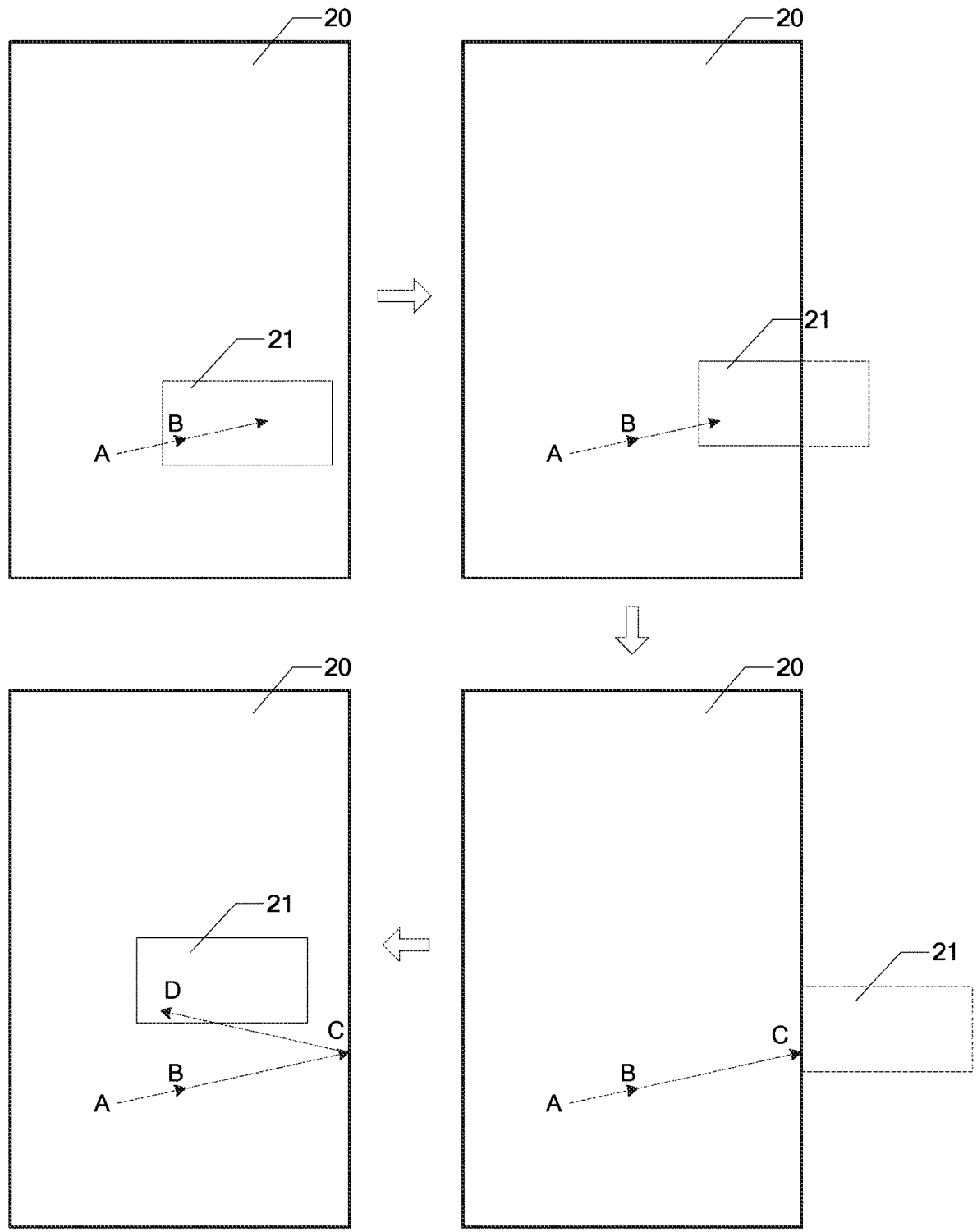

Referring to FIG. 2D, FIG. 2D is a schematic diagram of collision and rebound of a floating window. In a process that a floating window 21 performs, along a BC direction in the figure (C is a point on a right border of a screen 20), a forward decelerated rectilinear motion with a whipping operation, the floating window 21 gradually moves out of the screen 20 (a dashed-line box part of the floating window 21 in the figure represents a part that is not displayed and that is located out of the screen 20). When the floating window 21 entirely moves out of the screen 20 along the right border of the screen 20, if a moving speed of the floating window 21 is still greater than 0, a terminal device uses the right border of the screen 20 as a reflective surface, and controls the floating window 21 to continually perform the decelerated rectilinear motion along a reflection direction (that is, a CD direction in the figure, an angle between the BC and the right border of the screen 20 being equal to an angle between the CD and the right border of the screen 20) of the sliding direction, the floating window 21 keeping moving till the moving speed changes to 0.

In this embodiment, the floating window continually moves along the reflection direction of the sliding direction, to display a collision and rebound animation effect in a more realistic and accurate manner. Certainly, in another possible implementation, the terminal device may also control the floating window to continually perform the decelerated rectilinear motion along a designated direction. For example, the designated direction is a direction of a perpendicular line of a border that the floating window moves out from in a target display area.

In addition, the method provided in this embodiment further includes step 209 and step 210.

Step 209: When the moving speed of the floating window reduces to 0, detect whether the floating window is fully displayed in the target display area. If the floating window is fully displayed in the target display area, the procedure ends. If the floating window is not fully displayed in the target display area, step 210 is performed.

No matter after the floating window is dragged, whipped, or collided and rebounded, when the moving speed of the floating window reduces to 0, the terminal device detects whether the floating window is fully displayed in the target display area. That is, the terminal device detects whether the floating window is entirely displayed in the target display area.

Step 210: Control the floating window to move along a first designated path, the floating window keeping moving till being fully displayed in the target display area.

If the floating window is not fully displayed in the target display area, the terminal device controls the floating window to move along the first designated path, the floating window keeping moving till being fully displayed in the target display area. The first designated path may be a line segment along the direction of the perpendicular line of the border that the floating window moves out of the target display area, or may be a line segment along the reflection direction of the foregoing sliding direction, or may further be a line segment along another preset designated direction. In addition, the terminal device controls the floating window to smoothly move along the first designated path, so that a user can watch an animation effect in the moving process.

Figure 2E:
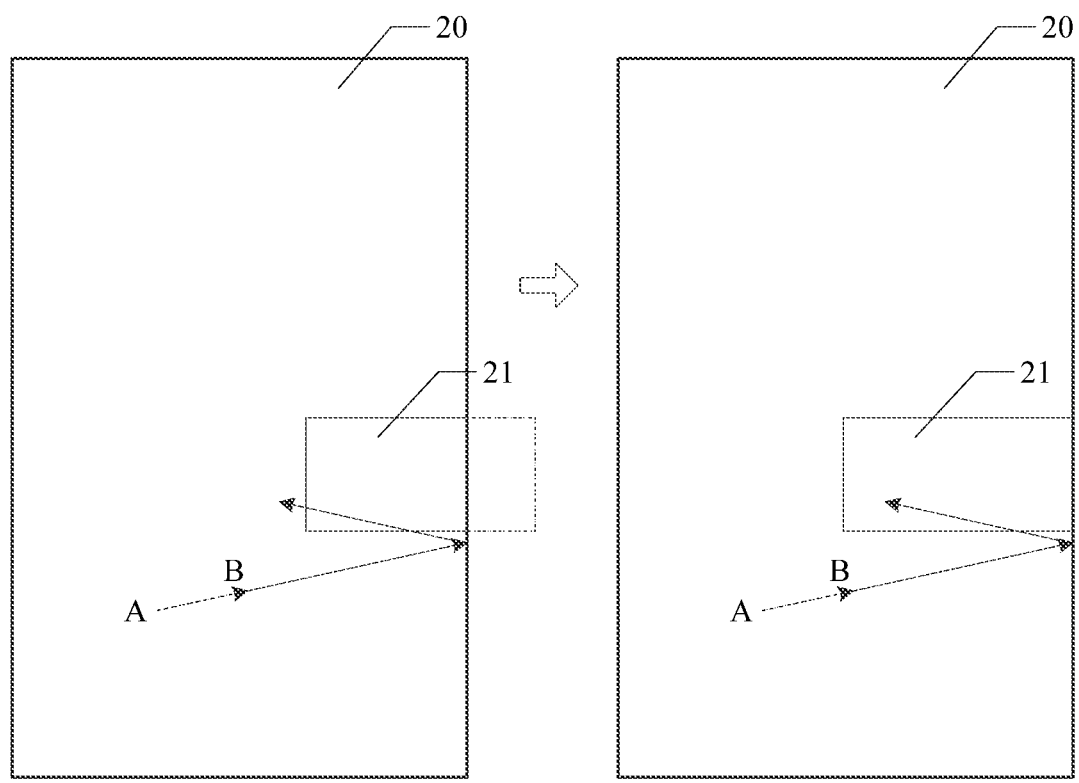

Referring to FIG. 2E, collision and rebound are used as an example. Assuming that a moving speed changes to 0 when a floating window 21 moves to a left side of FIG. 2E, the terminal device controls the floating window 21 to smoothly move towards the screen 20 along a direction of a perpendicular line of a border that the floating window moves out from or along the reflection direction described above, the floating window 21 keeping moving till the floating window 21 is fully displayed on the screen 20.

Optionally, after the operation signal that works on the floating window is obtained (step 202), a determining step may further be performed, to determine whether the operation is a sliding operation or a zoom operation. If there are two touch locations in a display screen, and a distance between the two touch locations changes with time, the operation may be determined as a zoom operation. If there is only one touch location in the display screen, and the touch location changes with time, the operation may be determined as a sliding operation.

Based on the above, in the method provided in this embodiment, after an operation signal that works on a floating window is obtained, a display form of the floating window is regulated according to the operation signal, so that a problem in the existing technology is resolved that a floating window is displayed in a fixed location on a screen, causing great inconvenience to a user for watching other content that is displayed out of the floating window, a moving function and a zoom function of the floating window are extended, and a requirement that a user regulates and controls the floating window in a self-defined manner is met. Therefore, it is convenient for the user to watch the other content that is displayed out of the floating window.

In addition, in the method provided in this embodiment, functions such as dragging, whipping, and collision and rebound of the floating window are extended, a requirement of the user to regulate and control a display location of the floating window in a self-defined manner is met, and user experience is fully improved.

Figure 3A:
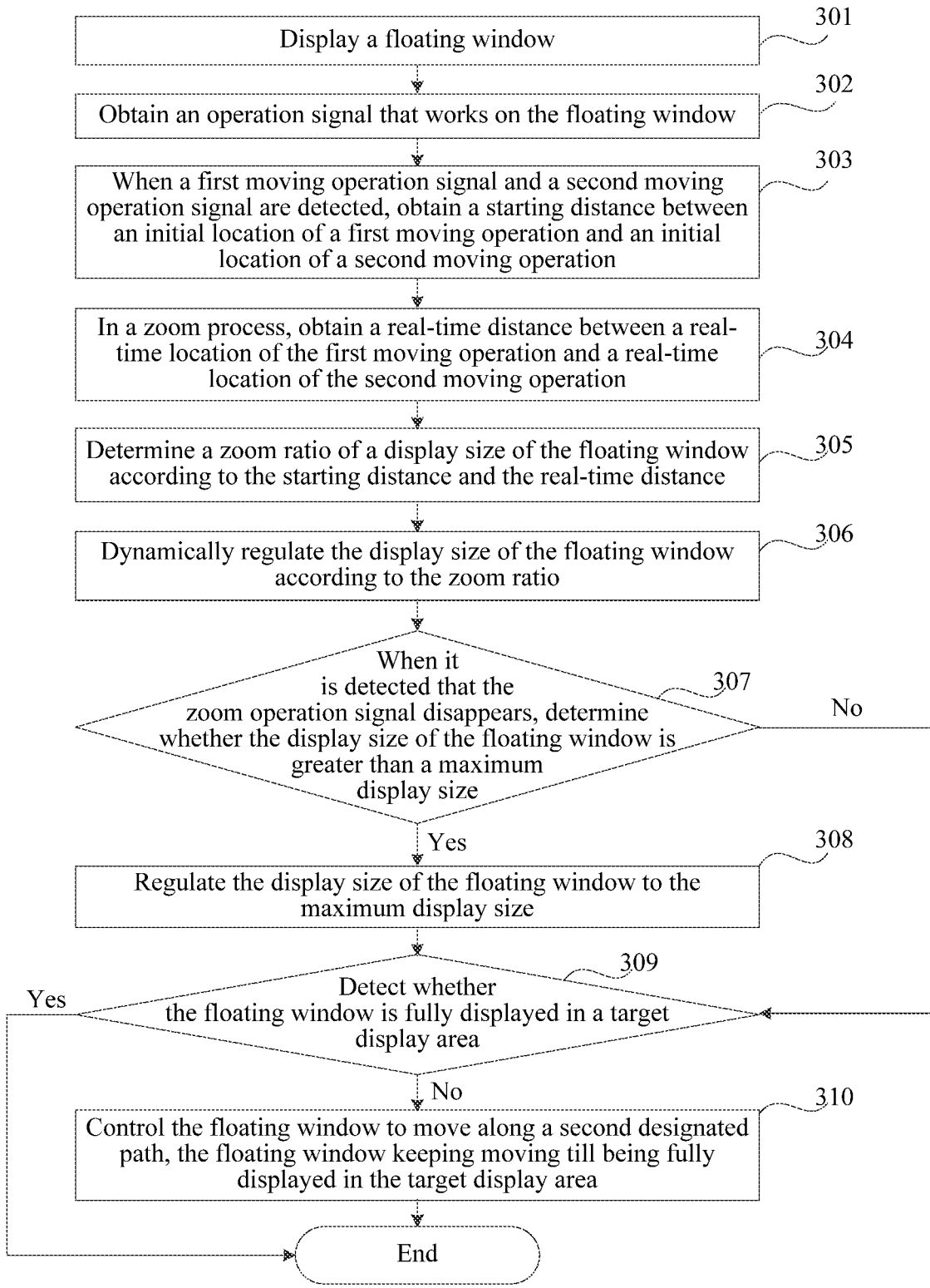
FIG. 3A is a flowchart of a floating window processing method according to another embodiment of the present disclosure.

Referring to FIG. 3A, FIG. 3A is a flowchart of a floating window processing method according to another embodiment of the present disclosure. The floating window may be used for playing a video, displaying an image or a text, or the like.

This embodiment is described below by using a floating window that is used for playing a video as an example. A person skilled in the art may understand that the following descriptions may also be applied to another type of floating window. The method may include the following several steps:

Step 301: Display a floating window.

The floating window is displayed in a target display area of a display screen of a terminal device.

A target display area refers to an area that is on a screen of a display and that is used for displaying a floating window. The floating window can only be displayed in the area, but cannot be displayed out of the area. For example, the target display area may be an entire screen area, or may be a part of the screen area. For ease of description, the target display area being the entire screen area is described below.

In this embodiment, that the floating window is a window whose size is adjustable is used as an example, that is, an attribute of the floating window is set to be size-adjustable, so that a display size of the floating window is adjustable.

Step 302: Obtain an operation signal that works on the floating window.

The terminal device obtains the operation signal that works on the floating window. This embodiment is described below by using the operation signal being a zooming operation signal as an example. It may be considered that a zoom operation is formed by a first moving operation and a second moving operation that are along opposite directions. A user may trigger, by using two fingers, two moving operation signals that work on the floating window and on which the two fingers move along two opposite directions, to trigger the display size of the floating window to be zoomed in/zoomed out. Specifically, when both directions of a first moving operation signal and a second moving operation signal are inward, the display size of the floating window is triggered to be zoomed out. When both the directions of the first moving operation signal and the second moving operation signal are outward, the display size of the floating window is triggered to be zoomed in.

Step 303: When a first moving operation signal and a second moving operation signal are detected (that is, a zoom operation signal is detected), obtain a starting distance between an initial location of a first moving operation and an initial location of a second moving operation.

When the first moving operation signal and the second moving operation signal are detected, the terminal device obtains the initial location of the first moving operation and the initial location of the second moving operation, and calculates the starting distance between the foregoing two initial locations.

Step 304: In a zoom operation process, obtain a real-time distance between a real-time location of the first moving operation and a real-time location of the second moving operation.

In a zoom process, the terminal device obtains the real-time location of the first moving operation and the real-time location of the second moving operation, and calculates the real-time distance between the foregoing two real-time locations in real time. A real-time location of a moving operation usually refers to a real-time touch location of a finger of a user.

Step 305: Determine a zoom ratio of a display size of the floating window according to the starting distance and the real-time distance.

The terminal device determines in real time a zoom ratio of the display size of the floating window according to the starting distance and the real-time distance. As a non-limiting example, the zoom ratios may be determined as real time distance divided by the starting distance. In a possible implementation, the display size of the floating window is zoomed in divided by zoomed out in a uniform zoom manner. A display size obtained after regulation/an original display size=the real-time distance divided by the starting distance. That is, a length obtained after regulation divided by an original length=a width obtained after regulation/an original width=the real-time distance divided by the starting distance.

Step 306: Dynamically regulate the display size of the floating window according to the zoom ratio.

In a processing of the zoom operation, the terminal device dynamically regulates in real time the display size of the floating window according to a zoom ratio that is determined in real time, to implement a zoom function of the floating window. In this embodiment, a zoom process of the floating window is a process that the floating window is gradually zoomed out or zoomed in with the first moving operation and the second moving operation.

Figure 3B:
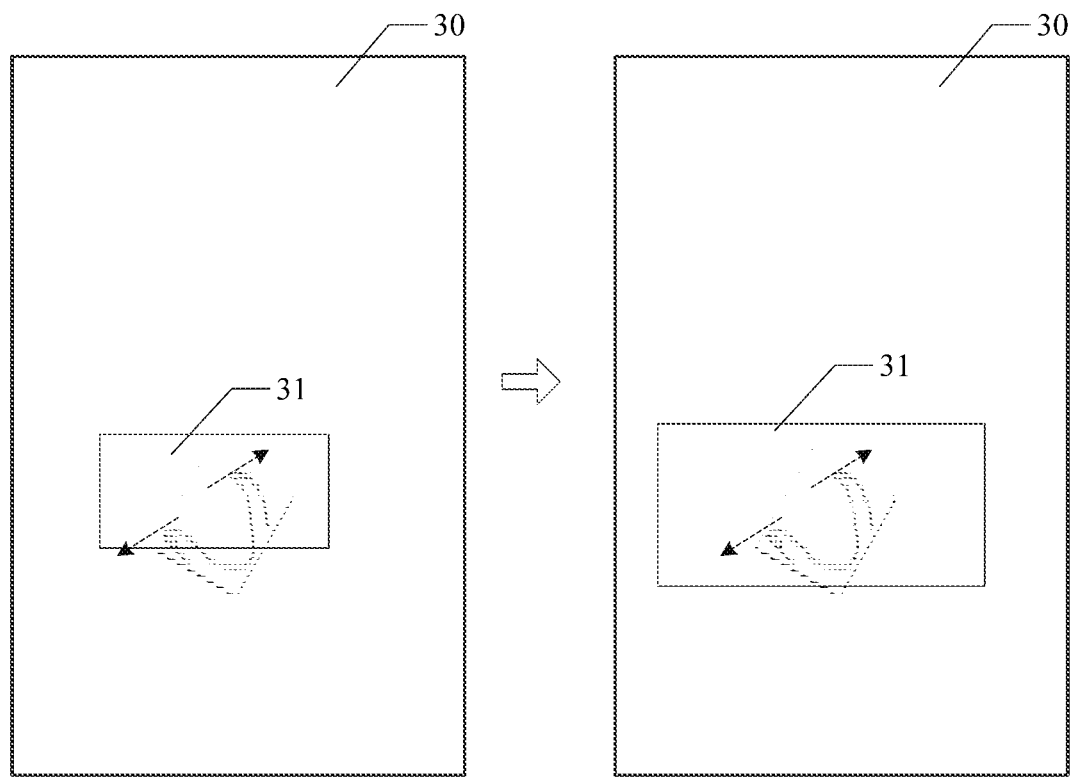
FIG. 3B and FIG. 3C are schematic diagrams of an interface that is related to the embodiment shown in FIG. 3A.

Referring to FIG. 3B, FIG. 3B is a schematic diagram of zooming a floating window. A floating window 31 is displayed on a screen 30 of a terminal device. That the floating window 31 is zoomed in is used as an example, two fingers of a user slide outward along opposite directions for a distance. In the sliding process, the floating window 31 is gradually zoomed in.

Step 307: When it is detected that the zoom operation signal (that is, the first moving operation signal and the second moving operation signal) disappears, determine whether the display size of the floating window is greater than a maximum display size. If the display size of the floating window is greater than the maximum display size, step 308 is performed. If the display size of the floating window is not greater than the maximum display size, step 309 is performed.

When it is detected that the first moving operation signal and the second moving operation signal disappear, the terminal device detects whether the display size of the floating window is greater than the preset maximum display size. The maximum display size may be set by a system by default, or may be defined by the user. The maximum display size may include a maximum display length and/or a maximum display width. For example, when the target display area is an entire screen, a maximum display length of the floating window is a width of the screen, and a maximum display width of the floating window is one third of a length of the screen. When a length of the floating window is garter than a length of the preset maximum display size or a width of the floating window is greater than a width of the preset maximum display size, it is determined that the display size of the floating window is greater than the preset maximum display size.

Step 308: Regulate the display size of the floating window to the maximum display size.

When the display size of the floating window is greater than the maximum display size, to ensure that the floating window is fully displayed in the target display area, the terminal device automatically regulates the display size of the floating window to the maximum display size, to implement a zoom and bounce back function of the floating window. In a zoom and bounce back process, the terminal device controls the floating window to be gradually zoomed out. The animation process is visible to the user.

Step 309: Detect whether the floating window is fully displayed in a target display area. If the floating window is fully displayed in the target display area, the procedure ends. If the floating window is not fully displayed in the target display area, step 310 is performed.

When the terminal device determines that the display size of the floating window is less than or equal to the maximum display size, or when the terminal device regulates the display size of the floating window to the maximum display size, the terminal device detects whether the floating window is fully displayed in the target display area.

Step 310: Control the floating window to move along a second designated path, the floating window keeping moving till being fully displayed in the target display area.

If the floating window is not fully displayed in the target display area, the terminal device controls the floating window to move along the second designated path, the floating window keeping moving till being fully displayed in the target display area. The second designated path may be a line segment along direction of a perpendicular line of the border that the floating window moves out of the target display area, or the second designated path may further be a line segment along another preset designated direction. In addition, the terminal device controls the floating window to smoothly move along the second designated path, so that the user can watch an animation effect in the moving process.

Figure 3C:
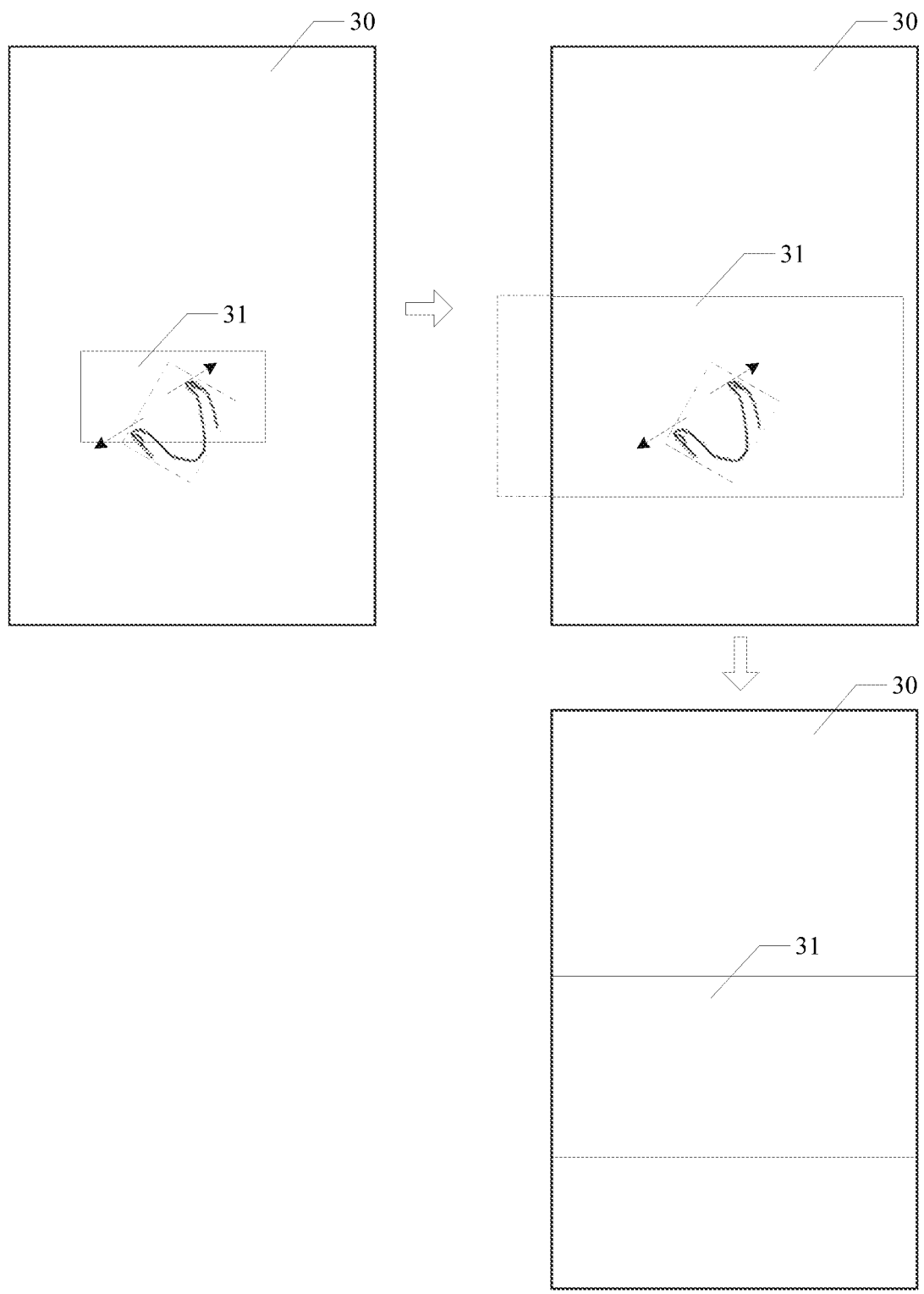

Referring to FIG. 3C, FIG. 3C is a schematic diagram of zooming and bounce back of a floating window. As a floating window 31 is gradually zoomed in, the floating window 31 gradually moves out of a screen 30 (a dashed-line box part of the floating window 31 in the figure represents a part that is not displayed and that is located out of the screen 30), or a display size of the floating window 31 even exceeds a maximum display size. In this case, the terminal device automatically controls the floating window 31 to be zoomed out to the maximum display size, and to be zoomed in and move towards the screen 30, so that the floating window 31 is fully displayed on the screen 30.

In addition, the terminal device may further prestore a minimum display size of the floating window. In a process of zooming out the floating window, if the display size of the floating window reaches the minimum display size, the floating window stops being zoomed out. Alternatively, when it is detected that a first moving operation signal and a second moving operation signal disappear, the terminal device detects whether the display size of the floating window is less than the minimum display size. If the display size of the floating window is less than the minimum display size, the display size of the floating window is regulated to the minimum display size, and then step 309 is performed. If the display size of the floating window is not less than the minimum display size, step 309 is performed.

Optionally, after the operation signal that works on the floating window is obtained (step 302), a determining step may further be performed, to determine whether the operation is a sliding operation or a zoom operation.

Based on the above, in the method provided in this embodiment, after an operation signal that works on a floating window is obtained, a display form of the floating window is regulated according to the operation signal, so that a problem in the existing technology that a floating window is displayed in a fixed location on a screen, causing great inconvenience to a user for watching other content that is displayed out of the floating window is resolved. A moving function and a zoom function of the floating window are extended, and a requirement that a user regulates and controls the floating window in a self-defined manner is met. Therefore, it is convenient for the user to watch the other content that is displayed out of the floating window.

In addition, in the method provided in this embodiment, functions such as zooming and zooming and bounce back of the floating window are extended, a requirement of the user to regulate and control a display size of the floating window in a self-defined manner is met, and user experience is fully improved.

In another embodiment, a floating window may have functions at a same time that are provided in the embodiments shown in FIG. 2A and FIG. 3A, to better meet video playing and watching requirements of a user, and provide more complete and cooler video playing and operating experience to the user. After detecting a touch operation triggered by the user, a terminal device may determine whether the touch operation is a touch operation (for example, the sliding operation described above) used for regulating a display location or is a touch operation (for example, the zoom operation described above) used for regulating a display size. If it is determined that the touch operation is the touch operation used for regulating the display location, the procedure of the steps provided in the embodiment shown in FIG. 2A is performed. If it is determined that the touch operation is the touch operation used for regulating the display size, the procedure of the steps provided in the embodiment shown in FIG. 3A is performed.

The following is apparatus embodiments of the present disclosure, which can be used to perform the method embodiments of the present disclosure. For details that are not disclosed in the apparatus embodiments of the present disclosure, refer to the method embodiments of the present disclosure.

Figure 4:
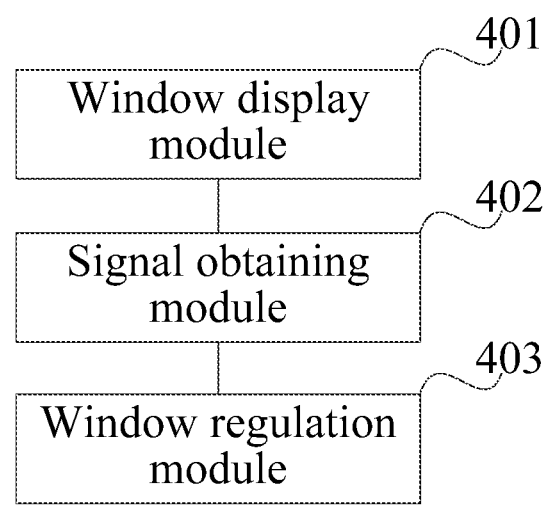
FIG. 4 is a block diagram of a floating window processing apparatus according to an embodiment of the present disclosure.

Referring to FIG. 4, FIG. 4 is a block diagram of a floating window processing apparatus according to an embodiment of the present disclosure. The apparatus may be applied to the foregoing terminal device. The apparatus may include a window display module 401, a signal obtaining module 402, and a window regulation module 403.

The window display module 401 is configured to display a floating window in a target display area of a display screen.

The signal obtaining module 402 is configured to obtain an operation signal of the floating window that is displayed by the window display module 401.

The window regulation module 403 is configured to determine a form variation parameter of the floating window according to the operation signal that is obtained by the signal obtaining module 402, and dynamically regulate a display form of the floating window according to the form variation parameter.

The display form includes a display location and/or a display size.

Based on the above, according to the apparatus provided in this embodiment, after an operation signal that works on a floating window is obtained, a display form of the floating window is regulated according to the operation signal, so that a problem in the existing technology that a floating window is displayed in a fixed location on a screen, causing great inconvenience to a user for watching other content that is displayed out of the floating window is resolved, A moving function and a zoom function of the floating window are extended, and a requirement that a user regulates and controls the floating window in a self-defined manner is met. Therefore, it is convenient for the user to watch the other content that is displayed out of the floating window.

Figure 5:
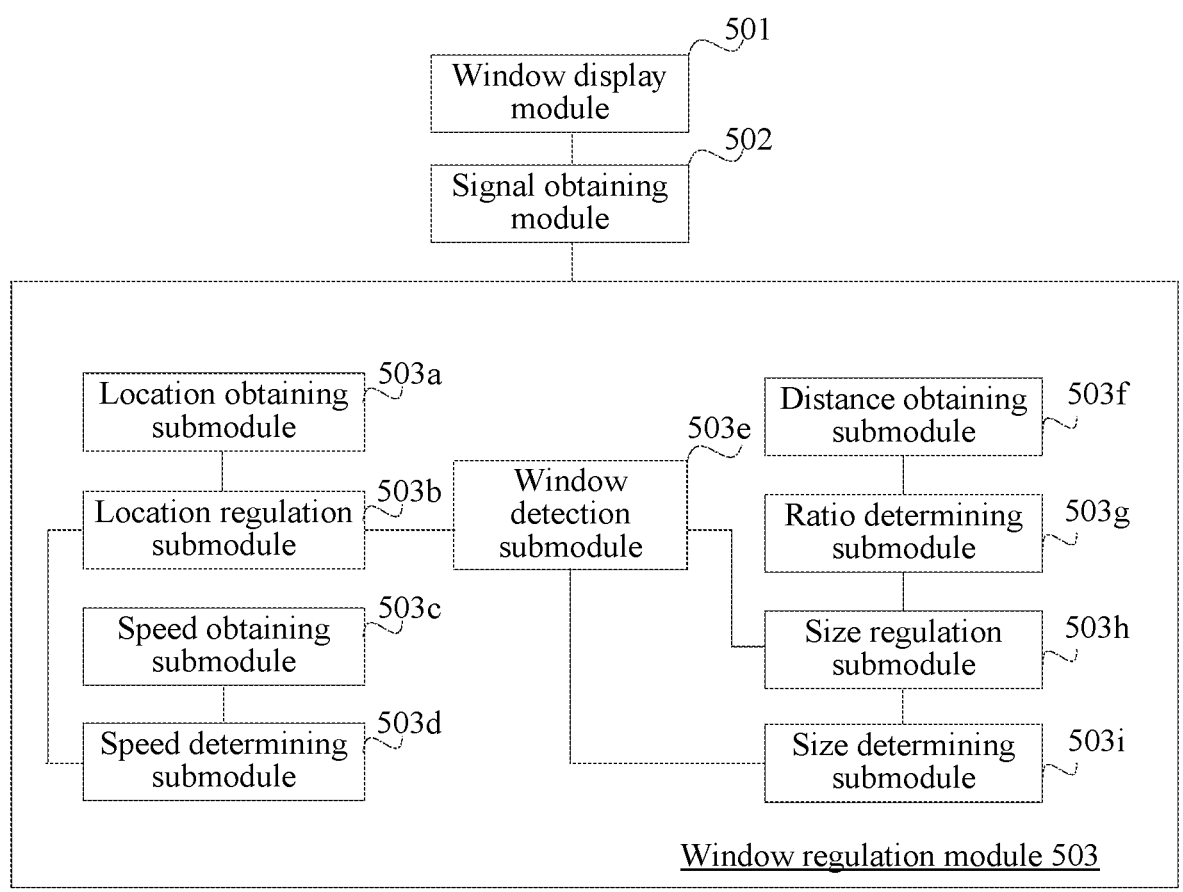
FIG. 5 is a block diagram of a floating window processing apparatus according to another embodiment of the present disclosure.

Referring to FIG. 5, FIG. 5 is a block diagram of a floating window processing apparatus according to another embodiment of the present disclosure. The apparatus may be applied to the foregoing terminal device. The apparatus may include a window display module 501, a signal obtaining module 502, and a window regulation module 503.

The window display module 501 is configured to display a floating window in a target display area of a display screen.

The signal obtaining module 502 is configured to obtain an operation signal of the floating window that is displayed by the window display module 501.

The window regulation module 503 is configured to determine a form variation parameter of the floating window according to the operation signal that is obtained by the signal obtaining module 502, and dynamically regulate a display form of the floating window according to the form variation parameter.

The display form includes a display location and/or a display size.

Optionally, the window regulation module 503 includes a location obtaining submodule 503a and a location regulation submodule 503b.

The location obtaining submodule 503a is configured to obtain a real-time location of a sliding operation when the operation is a sliding operation.

The location regulation submodule 503b is configured to dynamically regulate the display location of the floating window according to the real-time location obtained by the location obtaining submodule 503a.

Optionally, the window regulation module 503 further includes a speed obtaining submodule 503c and a speed determining submodule 503d.

The speed obtaining submodule 503c is configured to: when it is detected that a sliding operation signal disappears, obtain a sliding speed and/or a sliding direction at a time point when the sliding operation signal disappears.

The speed determining submodule 503d is configured to determine whether the sliding speed obtained by the speed obtaining submodule 503c is greater than a preset speed threshold.

The location regulation submodule 503b is configured to: if the speed detection submodule 503d detects that the sliding speed is greater than the preset speed threshold, control, according to the sliding speed and a target acceleration, the floating window to perform a decelerated rectilinear motion along the sliding direction that is at the time point when the operation signal disappears.

Optionally, the location regulation submodule 503b is further configured to: in a process of the decelerated rectilinear motion, when the floating window entirely moves out of the target display area, if a moving speed of the floating window is still greater than 0, control the floating window to continually perform the decelerated rectilinear motion along a reflection direction of the sliding direction.

Optionally, the window regulation module 503 may further include a window detection submodule 503e.

The window detection submodule 503e is configured to: when the moving speed of the floating window reduces to 0, detect whether the floating window is fully displayed in the target display area.

The location regulation submodule 503b is further configured to: when the window detection submodule 503e detects that the floating window is not fully displayed in the target display area, control the floating window to move along a first designated path, the floating window keeping moving till being fully displayed in the target display area.

Optionally, the window regulation module 503 includes a distance obtaining submodule 503f, a ratio determining submodule 503g, and a size regulation submodule 503h.

The distance obtaining submodule 503f is configured to: when the operation signal is a first moving operation signal and a second moving operation signal that are along opposite directions (that is, the operation signal is a zoom operation signal), and when detecting the first moving operation signal and the second moving operation signal, obtain a starting distance between an initial location of a first moving operation and an initial location of a second moving operation.

The distance obtaining submodule 503f is further configured to: in a zoom operation process, obtain a real-time distance between a real-time location of the first moving operation and a real-time location of the second moving operation.

The ratio determining submodule 503g is configured to determine, according to the starting distance and the real-time distance that are obtained by the distance obtaining submodule 503f, a zoom ratio of the display size of the floating window.

The size regulation submodule 503h is configured to dynamically regulate the display size of the floating window according to the zoom ratio determined by the ratio determining submodule 503g.

Optionally, the window regulation module 503 further includes a size determining submodule 503i.

The size determining submodule 503i is configured to: when it is detected that the first moving operation signal and the second moving operation signal disappear, determine whether the display size of the floating window is greater than a maximum display size.

The size regulation submodule 503h is further configured to: when the size detection submodule 503i detects that the display size of the floating window is greater than the maximum display size, regulate the display size of the floating window to the maximum display size.

The window detection submodule 503e is configured to detect whether the floating window is fully displayed in the target display area.

The location regulation submodule 503b is further configured to: when the window detection submodule 503e detects that the floating window is not fully displayed in the target display area, control the floating window to move along a second designated path, the floating window keeping moving till being fully displayed in the target display area.

Optionally, the window detection submodule 503e is further configured to: if the display size of the floating window is less than or equal to the maximum display size, detect whether the floating window is fully displayed in the target display area.

Based on the above, according to the apparatus provided in this embodiment, after an operation signal that works on a floating window is obtained, a display form of the floating window is regulated according to the operation signal, so that a problem in the existing technology that a floating window is displayed in a fixed location on a screen, causing great inconvenience to a user for watching other content that is displayed out of the floating window is resolved. A moving function and a zoom function of the floating window are extended, and a requirement that a user regulates and controls the floating window in a self-defined manner is met. Therefore, it is convenient for the user to watch the other content that is displayed out of the floating window.

In addition, according to the apparatus provided in this embodiment, functions such as moving, zooming, and bouncing back of the floating window are extended, a requirement of the user to regulate and control a display location and a display size of the floating window in a self-defined manner is met, and user experience is fully improved.

It should be noted that, when the apparatus provided in the foregoing embodiment implements the function of the apparatus, division of the foregoing function modules is used as an example for illustration. During actual application, the foregoing functions can be allocated to different function modules and be implemented according to a requirement, that is, an inner structure of the device is divided into different function modules to implement all or some of the functions described above. In addition, the apparatus provided in the foregoing embodiments and the method embodiments fall within a same conception. For details of a specific implementation process, refer to the method embodiments. Details are not described herein again.

Figure 6:
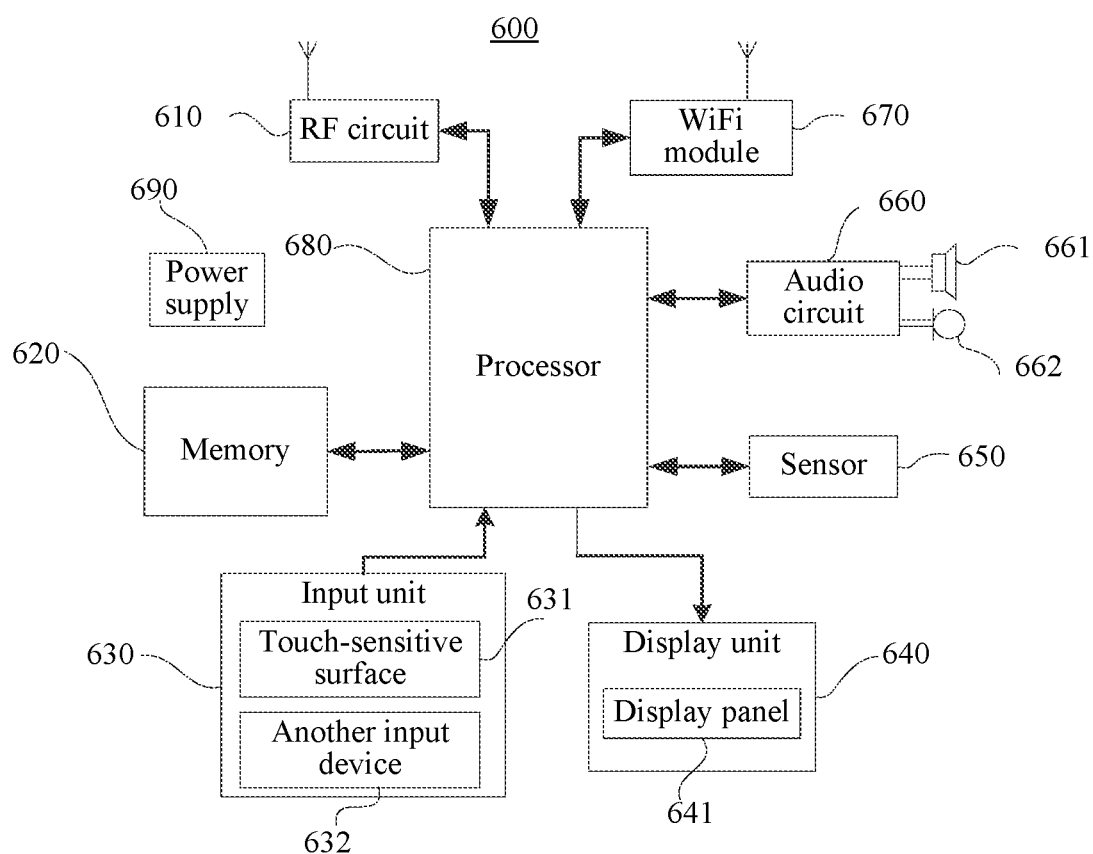
FIG. 6 is a block diagram of a terminal device according to an embodiment of the present disclosure.

Referring to FIG. 6, FIG. 6 is a schematic structural diagram of a terminal device 600 according to an embodiment of the present disclosure. The terminal device is configured to perform the floating window processing method provided in the foregoing embodiments.

Specifically, the terminal device 600 may include components such as a radio frequency (RF) circuit 610, a memory 620 that includes one or more computer readable storage media, an input unit 630, a display unit 640, a sensor 650, an audio circuit 660, a wireless fidelity (WiFi) module 670, a processor 680 that includes one or more processing cores, and a power supply 690. A person skilled in the art may understand that the structure of the terminal device shown in FIG. 6 is not intended to limit the terminal device, and the terminal device may include more components or fewer components than those shown in the figure, or some components may be combined, or a different component deployment may be used.

The RF circuit 610 may be configured to receive and send signals during an information receiving and sending process or a communication process. Particularly, the RF circuit 610 receives downlink information from a base station, then delivers the downlink information to the processor 680 for processing, and sends related uplink data to the base station. Generally, the RF circuit 610 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 610 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 620 may be configured to store a software program and one or more modules. The processor 680 runs the software program and modules stored in the memory 620, to implement various functional applications and data processing. The memory 620 may mainly include a program storage area and a data storage area. The program storage area may store an operating system, an application program required by at least one function (such as a sound playback function and an image display function), and the like. The data storage area may store data (such as audio data and an address book) created according to use of the terminal device 600, and the like. In addition, the memory 620 may include a high speed random access memory, and may also include a non-volatile memory, such as at least one magnetic disk storage device, a flash memory, or another volatile solid-state storage device. Correspondingly, the memory 620 may further include a memory controller, so as to provide access of the processor 680 and the input unit 630 to the memory 620.

The input unit 630 may be configured to receive input digit or character information, and generate a keyboard, mouse, joystick, optical, or track ball signal input related to the user setting and function control. Specifically, the input unit 630 may include a touch-sensitive surface 631 and another input device 632. The touch-sensitive surface 631, which may also be referred to as a touch screen or a touch panel, may collect a touch operation of a user on or near the touch-sensitive surface (such as an operation of a user on or near the touch-sensitive surface 631 by using any suitable object or accessory, such as a finger or a stylus), and drive a corresponding connection apparatus according to a preset program. Optionally, the touch-sensitive surface 631 may include two parts: a touch detection apparatus and a touch controller. The touch detection apparatus detects a touch location of the user, detects a signal generated by the touch operation, and transfers the signal to the touch controller. The touch controller receives the touch information from the touch detection apparatus, converts the touch information into touch point coordinates, and sends the touch point coordinates to the processor. Moreover, the touch controller can receive and execute a command sent from the processor. In addition, the touch-sensitive surface 631 may be a resistive, capacitive, infrared, or surface sound wave type touch-sensitive surface. In addition to the touch-sensitive surface 631, the input unit 630 may further include the another input device 632. Specifically, the another input device 632 may include, but is not limited to, one or more of a physical keyboard, a functional key (such as a volume control key or a switch key), a track ball, a mouse, and a joystick.

The display unit 640 may be configured to display information input by the user or information provided for the user, and various graphical user interfaces of the terminal device 600. The graphical user interfaces may be formed by a graph, a text, an icon, a video, or any combination thereof. The display unit 640 may include a display panel 641. Optionally, the display panel 641 may be configured by using a liquid crystal display (LCD), an organic light-emitting diode (OLED), or the like. Further, the touch-sensitive surface 631 may cover the display panel 641. After detecting a touch operation on or near the touch-sensitive surface 631, the touch-sensitive surface 631 transfers the touch operation to the processor, so as to determine the type of the touch event. Then, the processor provides a corresponding visual output on the display panel 141 according to the type of the touch event. Although, in FIG. 6, the touch-sensitive surface 631 and the display panel 641 are used as two separate parts to implement input and output functions, in some embodiments, the touch-sensitive surface 631 and the display panel 641 may be integrated to implement the input and output functions.

The terminal device 600 may further include at least one sensor 650, such as an optical sensor, a motion sensor, and other sensors. Specifically, the optical sensor may include an ambient light sensor and a proximity sensor. The ambient light sensor can adjust luminance of the display panel 641 according to brightness of the ambient light. The proximity sensor may switch off the display panel 641 and/or backlight when the terminal device 600 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal device 600, are not further described herein.

The audio circuit 660, a speaker 661, and a microphone 662 may provide audio interfaces between the user and the terminal device 600. The audio circuit 660 may convert received audio data into an electric signal and transmit the electric signal to the speaker 661. The speaker 661 converts the electric signal into a sound signal for output. On the other hand, the microphone 662 converts a collected sound signal into an electric signal. The audio circuit 660 receives the electric signal and converts the electric signal into audio data, and outputs the audio data to the processor 680 for processing. Then, the processor 680 sends the audio data to, for example, another terminal device by using the RF circuit 610, or outputs the audio data to the memory 620 for further processing. The audio circuit 660 may further include an earplug jack, so as to provide communication between a peripheral earphone and the terminal device 600.

WiFi is a short distance wireless transmission technology. The terminal device 600 may help, by using the WiFi module 670, the user to receive and send e-mails, browse a web page, access streaming media, and so on, which provides wireless broadband Internet access for the user. Although FIG. 6 shows the WiFi module 670, it may be understood that the WiFi module 670 is not a necessary component of the terminal device 600, and when required, the WiFi module 670 may be omitted as long as the scope of the essence of the present disclosure is not changed.

The processor 680 is a control center of the terminal device 600, and connects to various parts of the mobile phone by using various interfaces and lines. By running or executing the software program and/or module stored in the memory 620, and invoking data stored in the memory 620, the processor 180 performs various functions and data processing of the terminal device 600, thereby performing overall monitoring on the mobile phone. Optionally, the processor 680 may include one or more processing cores. Preferably, the processor 680 may integrate an application processor and a modem. The application processor mainly processes an operating system, a user interface, an application program, and the like. The modem mainly processes wireless communication. It may be understood that the foregoing modem may alternatively not be integrated into the processor 680.

The mobile phone 600 further includes the power supply 690 (such as a battery) for supplying power to the components. Preferably, the power supply may be logically connected to the processor 680 by using a power management system, thereby implementing functions such as charging, discharging and power consumption management by using the power management system. The power supply 690 may further include one or more of a direct current or alternating current power supply, a re-charging system, a power failure detection circuit, a power supply converter or inverter, a power supply state indicator, and any other components.

Although not shown in the figure, the terminal device 600 may further include a Bluetooth module, and the like, which are not further described herein.

Specifically, in this embodiment, the terminal device 600 further includes a memory and one or more programs. The one or more programs are stored in the memory and configured to be executed by one or more processors. The one or more programs contain instructions used for implementing the foregoing method.

It should be noted that, as used herein, the singular forms "a", "an" and "the" are intended to include the plural forms as well, unless the context clearly indicates otherwise. It should further be understood that, the term "and/or" used herein indicates and includes any or all possible combinations of one or more associated listed items.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for processing a floating window, wherein the method comprises:
    displaying, by a terminal device comprising a memory, a display screen, and a processor in communication with the memory and the display screen, a floating window in a target display area of the display screen;
    obtaining, by the terminal device, an operation signal that operates on the floating window, the operation signal comprising a signal from a sliding operation;
    determining, by the terminal device, a form variation parameter of the floating window according to the operation signal;
    dynamically regulating, by the terminal device, a display form of the floating window according to the form variation parameter, the display form comprising a display location or a display size;
    wherein the determining the form variation parameter of the floating window according to the operation signal and the dynamically regulating the display form of the floating window according to the form variation parameter comprise:
        obtaining, by the terminal device, a real-time location of the sliding operation, and
        dynamically regulating, by the terminal device, the display location of the floating window according to the real-time location;
    when it is detected that the operation signal disappears, obtaining, by the terminal device, a sliding speed and a sliding direction of the sliding operation at a time point when the operation signal disappears;
    determining, by the terminal device, whether the sliding speed is greater than a preset speed threshold;
    when the sliding speed is greater than the preset speed threshold, controlling, by the terminal device, the floating window to perform a decelerated rectilinear motion along the sliding direction with a moving speed of the floating window according to the sliding speed and a target acceleration;
    when the moving speed of the floating window reduces to 0, detecting, by the terminal device, whether the floating window is fully displayed in the target display area; and
    when it is detected that the floating window is not fully displayed in the target display area, controlling, by the terminal device, the floating window to move along a first designated path, the floating window keeping moving till being fully displayed in the target display area, the first designated path comprising a line segment along a perpendicular direction of a border that the floating window moves out of the target display area.

2. The method according to claim 1, further comprising:
during performing the decelerated rectilinear motion, when the floating window entirely moves out of the target display area and when the moving speed of the floating window is still greater than 0, controlling, by the terminal device, the floating window to continually perform the decelerated rectilinear motion along a reflection direction of the sliding direction.

3. The method according to claim 1, wherein:
the operation signal comprises a signal from a zoom operation; and
the determining the form variation parameter of the floating window according to the operation signal and dynamically regulating the display form of the floating window according to the form variation parameter comprise:
dynamically regulating, by the terminal device, the display size of the floating window according to the zoom operation.

4. The method according to claim 3, further comprising:
when it is detected that the operation signal disappears, determining, by the terminal device, whether the display size of the floating window is greater than a maximum display size; and
when it is determined that the display size of the floating window is greater than the maximum display size, regulating, by the terminal device, the display size of the floating window to the maximum display size.

5. The method according to claim 3, further comprising:
when it is detected that the operation signal disappears, determining, by the terminal device, whether the display size of the floating window is greater than a maximum display size;
when it is determined that the display size of the floating window is not greater than the maximum display size, detecting, by the terminal device, whether the floating window is fully displayed in the target display area; and
when it is detected that the floating window is not fully displayed in the target display area, controlling, by the terminal device, the floating window to move along a second designated path, the floating window keeping moving till being fully displayed in the target display area.

6. The method according to claim 1, wherein the floating window is used for playing a video.

7. An apparatus for processing a floating window, the apparatus comprising:
a memory storing instructions;
a display screen;
a processor in communication with the memory and the display screen, wherein, when the processor executes the instructions, the processor is configured to cause the apparatus to:
display a floating window in a target display area of the display screen;
obtain an operation signal that operates on the floating window, the operation signal comprising a signal from a sliding operation;
determine a form variation parameter of the floating window according to the operation signal;
dynamically regulate a display form of the floating window according to the form variation parameter, the display form comprising a display location or a display size; and wherein:
when the processor is configured to cause the apparatus to determine the form variation parameter of the floating window according to the operation signal and dynamically regulate the display form of the floating window according to the form variation parameter, the processor is configured to cause the apparatus to:
obtain a real-time location of the sliding operation, and
dynamically regulate the display location of the floating window according to the real-time location; and
when the processor executed the instructions, the processor is configured to further cause the apparatus to:
when it is detected that the operation signal disappears, obtain a sliding speed and a sliding direction of the sliding operation at a time point when the operation signal disappears,
determine whether the sliding speed is greater than a preset speed threshold,
when the sliding speed is greater than the preset speed threshold, control the floating window to perform a decelerated rectilinear motion along the sliding direction with a moving speed of the floating window according to the sliding speed and a target acceleration,
when the moving speed of the floating window reduces to 0, detect whether the floating window is fully displayed in the target display area, and
when it is detected that the floating window is not fully displayed in the target display area, control the floating window to move along a first designated path, the floating window keeping moving till being fully displayed in the target display area, the first designated path comprising a line segment along a perpendicular direction of a border that the floating window moves out of the target display area.

8. The apparatus according to claim 7, wherein, when the processor executed the instructions, the processor is configured to further cause the apparatus to:
during performing the decelerated rectilinear motion, when the floating window entirely moves out of the target display area and when the moving speed of the floating window is still greater than 0, control the floating window to continually perform the decelerated rectilinear motion along a reflection direction of the sliding direction.

9. The apparatus according to claim 7, wherein:
the operation signal comprises a signal from a zoom operation; and
when the processor is configured to cause the apparatus to determine the form variation parameter of the floating window according to the operation signal and dynamically regulate the display form of the floating window according to the form variation parameter, the processor is configured to cause the apparatus to:
dynamically regulate the display size of the floating window according to the zoom operation.

10. The apparatus according to claim 9, wherein, when the processor executed the instructions, the processor is configured to further cause the apparatus to:
when it is detected that the operation signal disappears, determine whether the display size of the floating window is greater than a maximum display size; and when it is determined that the display size of the floating window is greater than the maximum display size, regulate the display size of the floating window to the maximum display size.

11. The apparatus according to claim 9, wherein, when the processor executed the instructions, the processor is configured to further cause the apparatus to:
when it is detected that the operation signal disappears, determine whether the display size of the floating window is greater than a maximum display size;
when it is determined that the display size of the floating window is not greater than the maximum display size, detect whether the floating window is fully displayed in the target display area; and
when it is detected that the floating window is not fully displayed in the target display area, control the floating window to move along a second designated path, the floating window keeping moving till being fully displayed in the target display area.

12. The apparatus according to claim 7, wherein the floating window is used for playing a video.

13. A non-transitory computer readable storage medium storing an instruction, and the instruction, when executed by a processor of an apparatus, causing the apparatus to perform:
displaying a floating window in a target display area of a display screen;
obtaining an operation signal that operates on the floating window, the operation signal comprising a signal from a sliding operation;
determining a form variation parameter of the floating window according to the operation signal;
dynamically regulating a display form of the floating window according to the form variation parameter, the display form comprising a display location or a display size;
wherein the determining the form variation parameter of the floating window according to the operation signal and the dynamically regulating the display form of the floating window according to the form variation parameter comprise:
obtaining a real-time location of the sliding operation, and
dynamically regulating the display location of the floating window according to the real-time location;
when it is detected that the operation signal disappears, obtaining a sliding speed and a sliding direction of the sliding operation at a time point when the operation signal disappears;
determining whether the sliding speed is greater than a preset speed threshold;
when the sliding speed is greater than the preset speed threshold, controlling the floating window to perform a decelerated rectilinear motion along the sliding direction with a moving speed of the floating window according to the sliding speed and a target acceleration;
when the moving speed of the floating window reduces to 0, detecting whether the floating window is fully displayed in the target display area; and
when it is detected that the floating window is not fully displayed in the target display area, controlling the floating window to move along a first designated path, the floating window keeping moving till being fully displayed in the target display area, the first designated path comprising a line segment along a perpendicular direction of a border that the floating window moves out of the target display area.

14. The non-transitory computer readable storage medium according to claim 13, wherein:
the operation signal comprises a signal from a zoom operation; and
the determining the form variation parameter of the floating window according to the operation signal and dynamically regulating the display form of the floating window according to the form variation parameter comprise:
dynamically regulating the display size of the floating window according to the zoom operation.

* * * * *